United States Patent
Schaffner et al.

(10) Patent No.: US 6,543,798 B2
(45) Date of Patent: Apr. 8, 2003

(54) ANTI-TIP CASTER SUSPENSION FOR A WHEELCHAIR

(75) Inventors: Walter E. Schaffner, Shavertown, PA (US); Walter A. Watkins, Courtdale, PA (US); Gerald J. White, Jr., Hunlock Creek, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 0 days.

(21) Appl. No.: 09/811,683

(22) Filed: Mar. 19, 2001

(65) Prior Publication Data

US 2002/0030343 A1 Mar. 14, 2002

Related U.S. Application Data

(60) Provisional application No. 60/194,677, filed on Apr. 4, 2000.

(51) Int. Cl.$^7$ .............................. B60B 33/00; A61G 5/00
(52) U.S. Cl. .................... 280/250.1; 280/755; 280/86.1; 16/44
(58) Field of Search ....................... 180/907; 280/250.1, 280/755, 86.1, 124.111, 124.113, 124.126, 124.179, 5.28; 16/44, 35 D

(56) References Cited

U.S. PATENT DOCUMENTS

| | | | |
|---|---|---|---|
| 748,548 A | 12/1903 | Wenzelmann | |
| 2,470,978 A | 5/1949 | DuBrie | 16/44 |
| 4,078,817 A | 3/1978 | Ferguson et al. | |
| 4,310,167 A | 1/1982 | McLaurin | 280/5.28 |
| 4,436,320 A | 3/1984 | Brudermann et al. | |
| 4,455,031 A | 6/1984 | Hosaka | |
| 4,678,197 A * | 7/1987 | Stein | 180/236 |
| 4,861,056 A | 8/1989 | Duffy et al. | 280/250.1 |
| 5,145,020 A | 9/1992 | Quintile et al. | 180/65.1 |
| 5,435,404 A | 7/1995 | Garin | 180/6.5 |
| 5,772,237 A | 6/1998 | Finch et al. | |
| 5,899,475 A | 5/1999 | Verhaeg et al. | 280/250.1 |
| 5,944,131 A | 8/1999 | Schaffner et al. | 180/65.1 |
| 5,964,473 A * | 10/1999 | Degonda et al. | 180/907 |
| 5,996,716 A | 12/1999 | Montiglio et al. | |
| 6,070,898 A | 6/2000 | Dickie et al. | 280/304.1 |
| 6,129,165 A | 10/2000 | Schaffner et al. | 180/65.1 |
| 6,131,679 A * | 10/2000 | Pulver et al. | 180/65.1 |
| 6,199,647 B1 * | 3/2001 | Schaffner et al. | 180/65.1 |
| 6,234,507 B1 * | 5/2001 | Dickie et al. | 180/65.1 |
| 6,196,343 B1 | 6/2001 | Strautnieks | 180/22 |
| 6,244,025 B1 * | 6/2001 | Ferris et al. | 56/15.8 |
| 6,341,657 B1 | 1/2002 | Hopely, Jr. et al. | |
| 6,357,793 B1 * | 3/2002 | Dickie et al. | 16/20 |

FOREIGN PATENT DOCUMENTS

| | | | |
|---|---|---|---|
| GB | 2 063 187 A | * | 6/1981 |
| GB | 2199291 | | 7/1988 |

OTHER PUBLICATIONS www.froglegsinc.com, pages /frogl.htm and /power.htm, printed Dec. 4, 1999.

* cited by examiner

*Primary Examiner*—Paul N. Dickson
*Assistant Examiner*—Ruth Ilan
(74) *Attorney, Agent, or Firm*—Drinker Biddle & Reath LLP

(57) ABSTRACT

An anti-tip suspension for a wheelchair having rear casters is defined. The suspension includes a rocker arm support, a rocker arm and a spring. The rocker arm is pivotally attached to the rocker arm support so that it is rotatable with respect to the rocker arm support. The spring engages the rocker arm and rocker arm support, biasing them away from one another. The rocker arm includes a rotation limiter that limits the rotation of the rocker arm with respect to the rocker arm support in one direction.

28 Claims, 9 Drawing Sheets

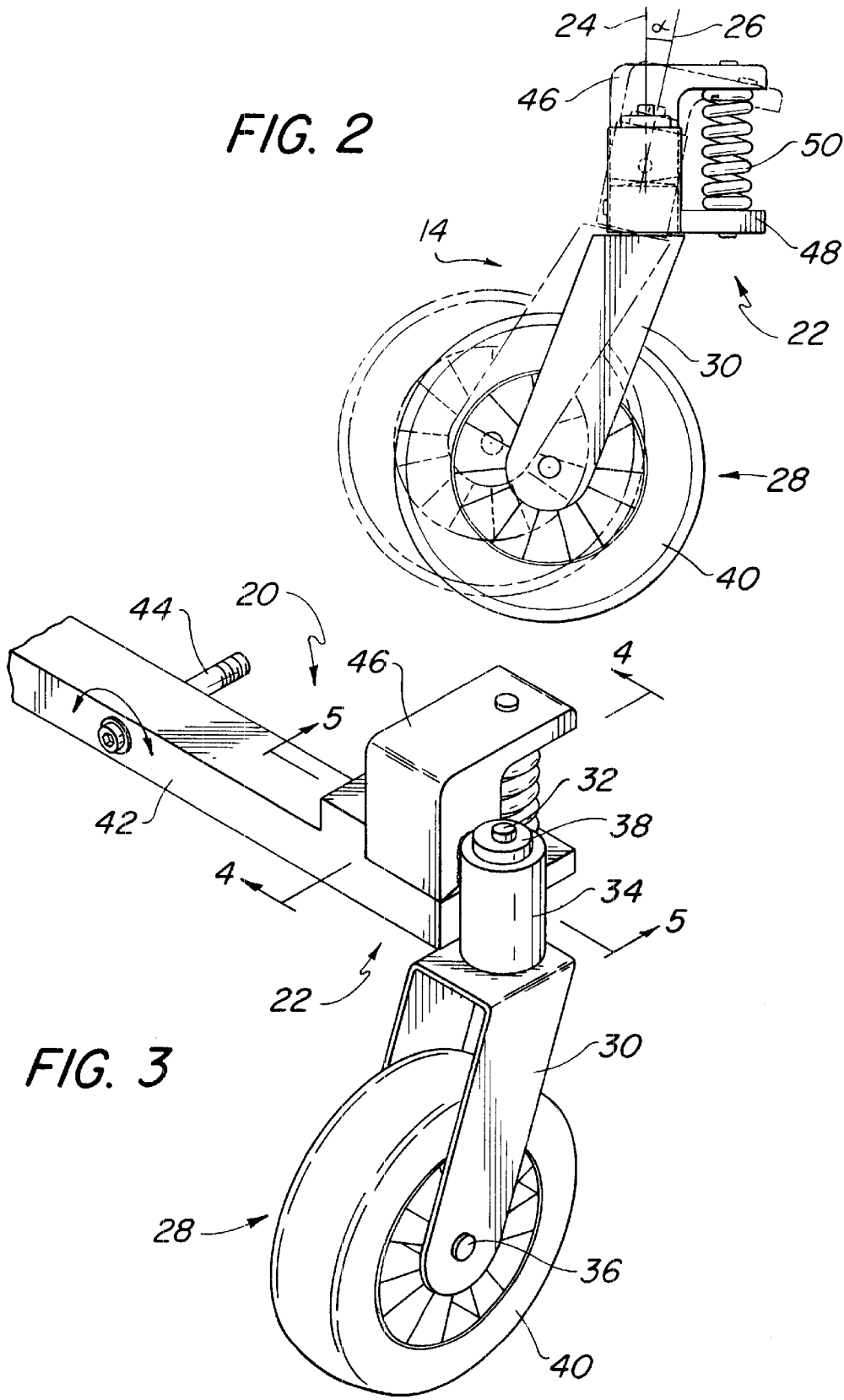

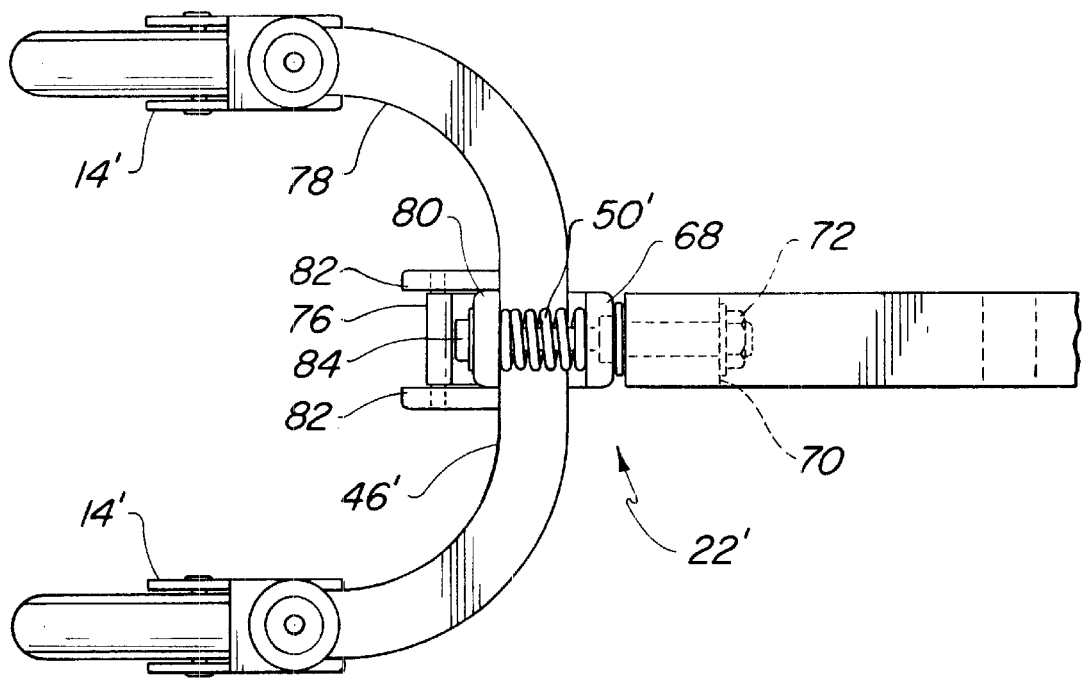

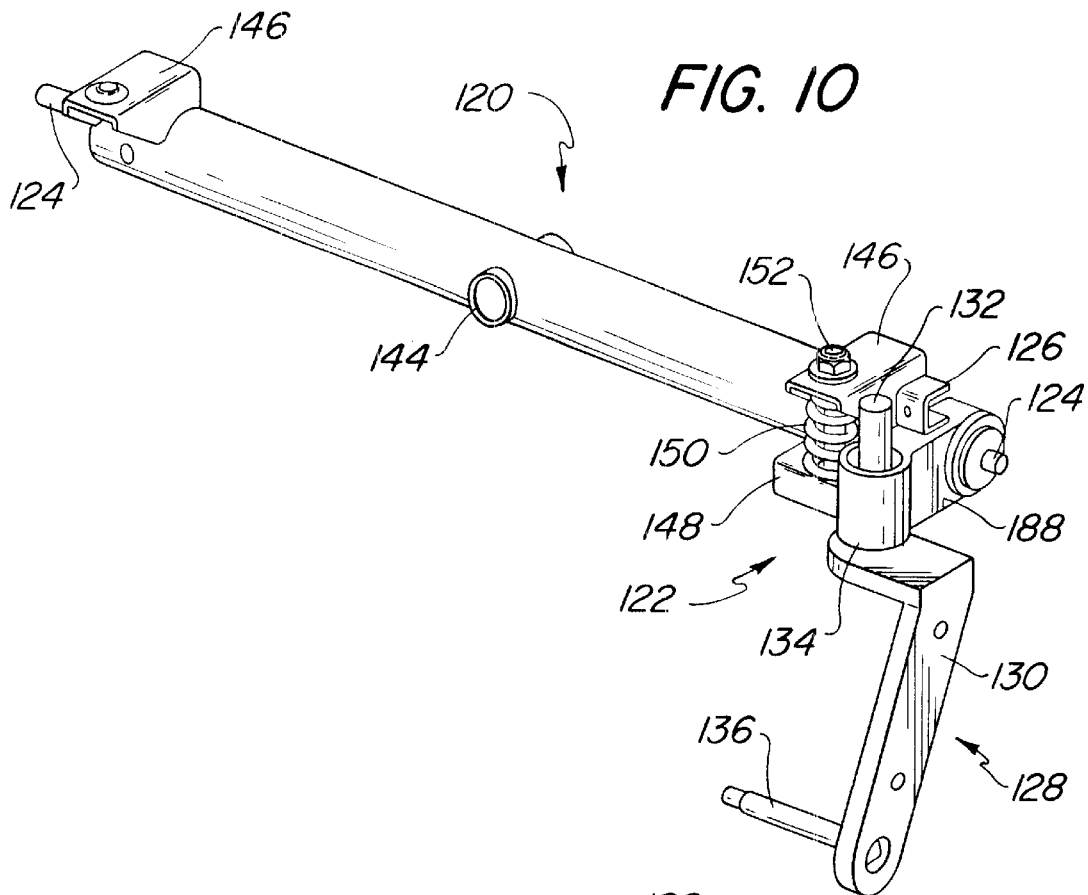
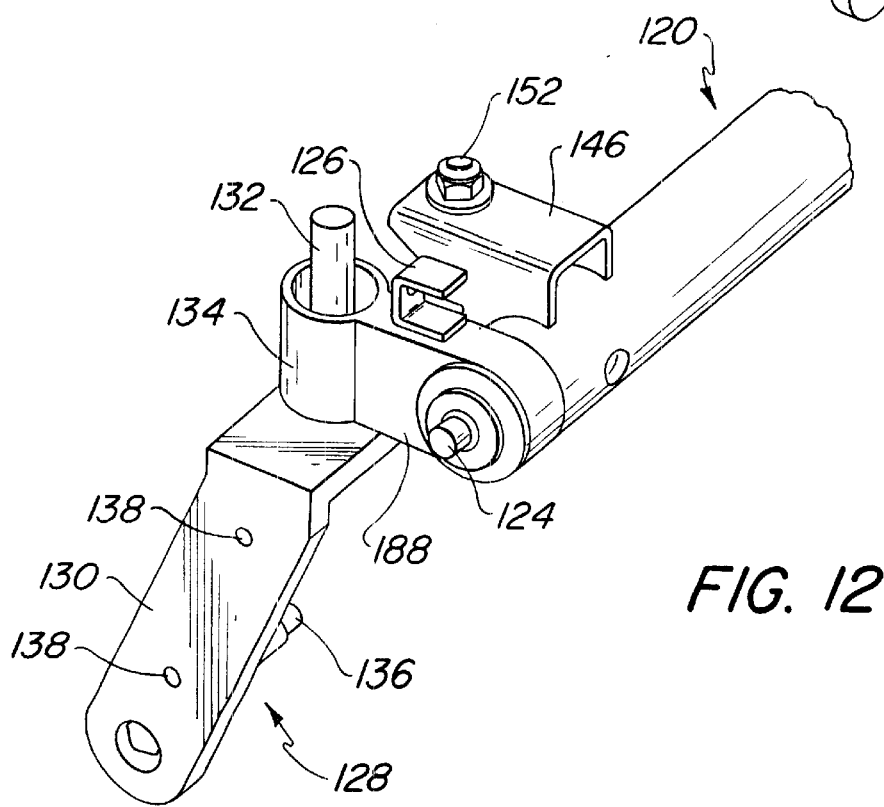

ANTI-TIP CASTER SUSPENSION FOR A WHEELCHAIR

The benefit of the filing date of U.S. Provisional Application Ser. No. 60/194,677, filed Apr. 4, 2000, is hereby claimed.

FIELD OF THE INVENTION

The present invention is generally related to suspension systems for wheeled vehicles. More particularly, the present invention is related to suspension systems for wheelchairs.

BACKGROUND OF THE INVENTION

Motorized front and mid-wheel drive wheelchairs having rear casters generally do not include a resilient suspension for those casters. These wheelchairs rely only on the compliance of inflatable tires on the casters to cushion the rider and wheelchair components when the wheelchair is driven across rough or uneven terrain and to absorb dynamic loads caused by accelerating and decelerating the wheelchair. Although this conventional approach is satisfactory under some conditions, it does not provide an acceptable ride for the range of conditions encountered during normal use. A smooth ride over a broad range of conditions would reduce fatigue and the possibility of injury to the rider and damage to the components of the wheelchair, such as the electrical and drive systems.

Some rear-caster wheelchairs do have resilient suspensions for the rear casters. However, these suspensions deflect under load regardless of the swivel orientation of the caster's wheel. A problem with these suspensions is that they can make the wheelchair unstable when driven backwards down a slope, off a curb or the like.

When a wheelchair having rear casters is driven backwards, the caster wheels swivel and become positioned toward the front of the wheelchair. In this position, the wheelbase is shortened and the casters are located closer to the center of gravity of the wheelchair and rider, increasing the proportion of the weight of the wheelchair and rider supported by the casters. As the caster suspension deflects under the increased load, the wheelchair tilts, moving the center of gravity even closer to the rear casters, decreasing the stability of the wheelchair. When driven backward down a slope, off a curb or the like, the load shifts even more to the rear casters and causes the suspension to deflect further, causing the wheelchair to tilt at an even greater angle and further decreased stability. On severe down-slopes, the tilt angle of the wheelchair may become so large that the center of gravity falls outside the wheelbase, causing the wheelchair to tip over and injury to the rider.

Another problem with a wheelchair having rear casters is that the casters tend to swivel sideways when ascending a curb or other upstanding obstacle. When a front or mid-wheel drive wheelchair ascends a curb, the drive wheels are first driven up the curb. When the drive wheels are on top of the curb but the casters are not, the wheelchair is in a relatively severe rearward-tilt position. In this position, the swivel axis of each caster is tilted rearward with respect to the vertical, making the caster unstable. In this rearward tilt position, the weight supported by the caster tends to cause the caster to swivel from its unstable, trailing position until it is at least sideways with respect to the face of the curb. As the wheelchair moves forward, the caster is dragged sideways up the face of the curb, causing damage to the caster. This effect is even more of a problem when the wheelchair is driven up a curb at an angle of other than 90° with respect to the curb.

One solution to the tendency of the caster to approach a curb sideways when the wheelchair is ascending the curb is to mount the casters to the wheelchair with their swivel axes tilted toward the front of the wheelchair rather than vertical. The forward tilt angle counteracts the rearward tilt of the swivel axis caused by the tilt of the wheelchair as it is ascending a curb. This solution is described in British Patent Application no. 2 199 291 A. However, as discussed in that application, tilting the swivel axis too far forward causes the caster end of the wheelchair to raise and lower each time the casters swivel from a trailing position to a leading position and vice versa. This motion can cause great discomfort to the user.

A further problem with a wheelchair having conventional casters is that the casters are prone to "flutter," i.e., sideways oscillations about their swivel axes. Flutter is particularly a problem when the wheelchair is driven relatively fast in a straight line and the casters engage bumps or other irregularities in surface being traversed. The irregularities can cause the casters to swivel sideways, causing the casters to oscillate side-to-side, or flutter. The tendency of the casters to flutter can be reduced by mounting the casters to the wheelchair so that their swivel axes are tilted forward. However, too little a tilt angle will not eliminate flutter, and too great a tilt angle will cause the caster end of the wheelchair to raise and lower as the casters swivel from a trailing position to a leading position and vice versa.

SUMMARY OF THE INVENTION

The present invention is directed to a caster and suspension assembly. In one aspect of the invention, the assembly includes a rocker arm having a pivot axis. The rocker arm is pivotally attached to the rocker arm support such that the rocker arm may be pivoted relative to the rocker arm support about the pivot axis. A caster is swivelably attached to the rocker arm. A resilient member has a pair of spaced-apart ends. One end of the resilient member engages the rocker arm support, and the other end engages the rocker arm. A rotation limiter engages the rocker arm support and limits the rotation of the rocker arm relative to the rocker arm support in one direction. The assembly has an unloaded configuration wherein the resilient member biases the rocker arm into engagement with the rotation limiter.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 2 is a side elevational view of the caster suspension of FIG. 1 showing the caster in a trailing position.

FIG. 3 is an isometric view of the caster suspension shown in FIG. 1.

FIG. 6 is a top plan view of an embodiment of a suspension for a caster support arm.

FIG. 7 is a side elevational view of the suspension shown in FIG. 6.

FIG. 10 is a perspective view of an alternate embodiment of the caster suspension system of the present invention.

FIG. 12 is an opposite side close-up perspective view of the caster suspension system shown in FIGS. 11.

DETAILED DESCRIPTION OF THE DRAWINGS

Figure 1:
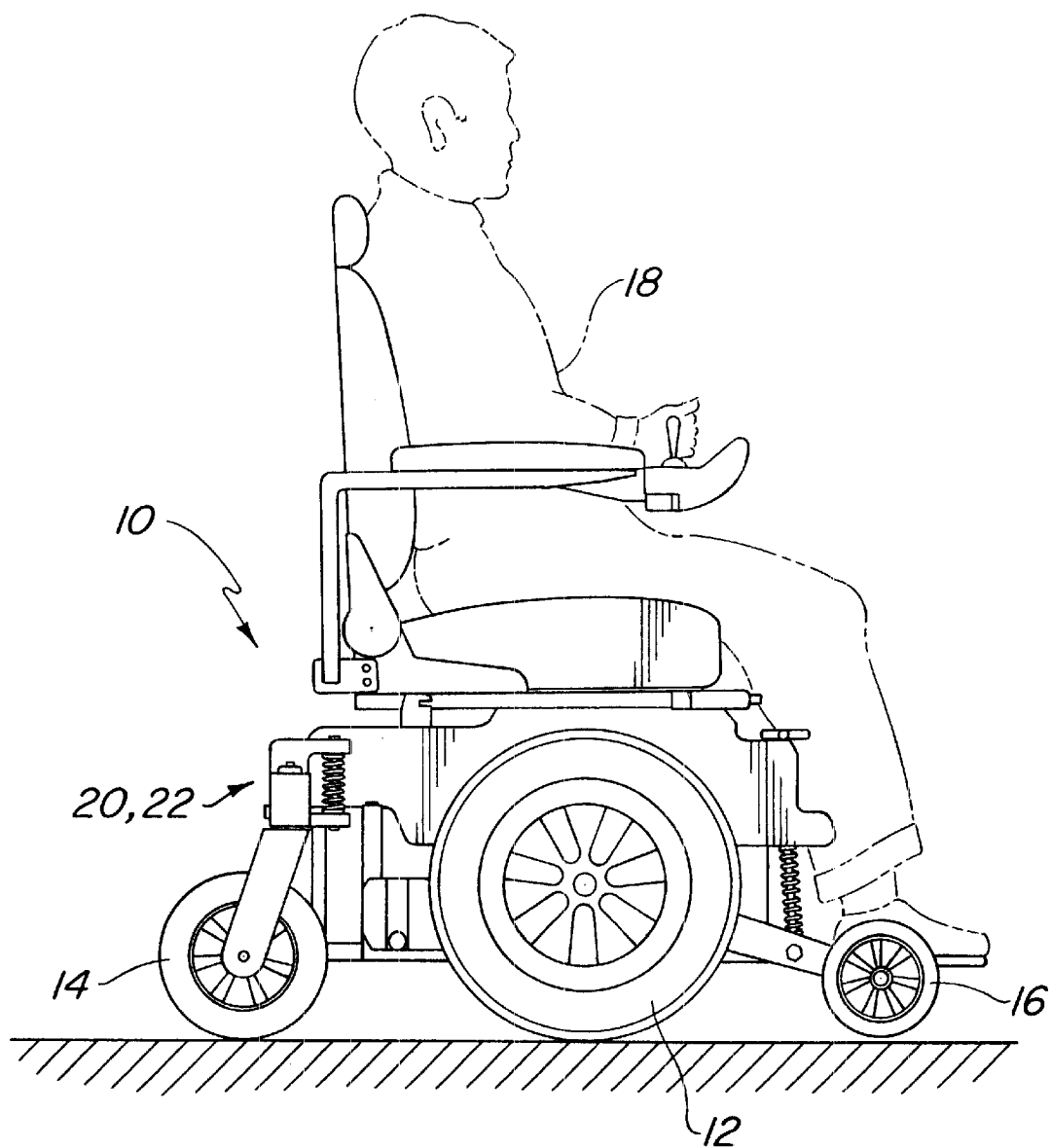
FIG. 1 is a side elevational view of a wheelchair incorporating an anti-tip caster suspension according to the present invention.

Referring to the drawings, wherein like numerals indicate like elements, FIG. 1 illustrates a wheelchair, which is generally denoted by the numeral 10. The wheelchair is a mid-wheel drive wheelchair characterized by a pair of relatively large drive wheels 12 positioned between a pair of rear casters 14 and a pair of non-caster front wheels 16. The drive wheels 12 are driven by an electric motor (not shown). Such a wheelchair is more particularly shown and described in U.S. Pat. No. 5,944,131, which is incorporated herein by reference.

The rear casters 14 in conjunction with the drive wheels 12 support the weight of the wheelchair 10 and a rider 18 under normal conditions when the rider is seated. The front wheels 16 are provided to prevent the wheelchair 10 from tipping forward when the rider 18 is exiting the wheelchair 10, when the wheelchair 10 is in an extreme forward-tilt position, such as when driven down a severe slope, off of a relatively high curb or the like, and when the wheelchair is quickly accelerated in reverse or abruptly decelerated while moving forward. The front wheels 16 also help the wheelchair 10 traverse curbs and other obstacles more easily. U.S. Pat. No. 5,944,131 more particularly describes the function of the front wheels 16. Under normal conditions when the wheelchair 10 is driven across a horizontal surface, the front wheels 16 preferably do not contact the ground.

The rear casters 14 are attached to the wheelchair 10 by a rear suspension 20, which includes an anti-tip suspension 22 for each caster 14 that provides the wheelchair 10 with several desirable features. Among these features are a smoother ride, improved ability of the wheelchair to climb curbs and other upstanding obstacles and reduced caster flutter during straight-line travel. In order to provide these features, the anti-tip suspension 22 is designed to be compliant during acceleration, upon encountering uneven terrain and/or relatively small obstacles and when the wheelchair is driven forward up a slope, curb or the like.

Designing the anti-tip suspension 22 to be compliant during acceleration and upon encountering uneven terrain and/or relatively small obstacles provides the rider with a smoother ride than if the anti-tip suspension were not provided. A rear-caster front or mid-wheel drive wheelchair not having a suspension for the rear casters tends to jerk the rider significantly during rapid acceleration. This is so because there are only a resilient caster tires to absorb the weigh shift to the rear casters caused by the acceleration. Generally, the resilience of the tires alone can not provide the compliance necessary to properly absorb the dynamic forces and provide a smoother ride. Nor do the resilient tires provide sufficient dampening to prevent the wheelchair from oscillating fore and aft during acceleration and deceleration. Similarly, resilient tires alone generally can not provide the necessary compliance to sufficiently absorb the shocks generated when the casters encounter rough terrain and/or small obstacles. These unabsorbed shocks and oscillations are transmitted to the rider and result in an uncomfortable ride. The anti-tip suspension 22 of the present invention is able to absorb these undesirable shocks and oscillatory vibrations.

Designing the anti-tip suspension 22 to be compliant when the caster 14 encounters an object as the wheelchair is traveling in a straight line tends to prevent caster flutter. This is so because each caster 14 is permitted to individually rotate clockwise (as seen in FIG. 2) when it contacts an object, tilting the swivel axis from a vertical position 24 through a tilt angle a to a forward-tilt position 26. When the swivel axis is in a forward-tilt position, such as position 26, the geometry of the anti-tip suspension 22 is such that the caster 14 is in a more stable position, which is less prone to flutter.

The individual suspension supporting the casters has other advantages. First, the load is split over two springs instead of one. Overall, the spring rate of each caster spring is reduced, creating a better suspension. Also, this allows the caster to be more active when encountering objects. Further, allowing the caster to be rotated individually will allow one caster to rotate over an object, giving suspension, while allowing the other to support the rider with little or no vertical movement when the caster comes in contact with obstacles. Other advantage will also be apparent to those in the art.

Designing the anti-tip suspension 22 to be compliant upon the wheelchair 10 being driven forward up a curb or other upstanding obstacle allows the castor 14 to approach the curb along the line of the wheelchair's travel, rather than swiveling sideways. When a conventional front or mid-wheel drive wheelchair having casters with fixed, vertical swivel axes is driven up a curb, the casters tend to swivel sideways upon their approach to the curb. Once the drive wheels are on the upper surface of the curb, the wheelchair tilts backwards and some of the weight of the wheelchair and rider shifts to the rear casters. The increased weight on the casters and their geometry with respect to the loads transmitted through them cause the casters to swivel to a more stable position. Once they have swivelled, they are no longer oriented to allow the tire to strike and roll up the face of the curb. Usually, the casters end up hitting the face of the curb at right angles such that the sides of the casters are dragged up the curb. However, the anti-tip suspension 22 of the present invention allows the swivel axis of each caster 14 to tilt forward, for example to the position 26 shown in FIG. 2, placing the caster 14 in a more stable position when the drive wheels 12 are on the upper surface of the curb.

Another advantage to a compliant suspension for the caster occurs when climbing an obstacle or curb. As the rear mounted caster wheels compress, the forward wheels tend to raise off the ground making it easier to overcome the obstacle. In the specific configuration shown in FIG. 1, the inclusion of a suspension of the rear mounted castors 14 permits the forward anti-tip wheels 16 to be positioned lower to the ground, while still permitting the anti-tips climb curbs or the like.

Figure 2A:
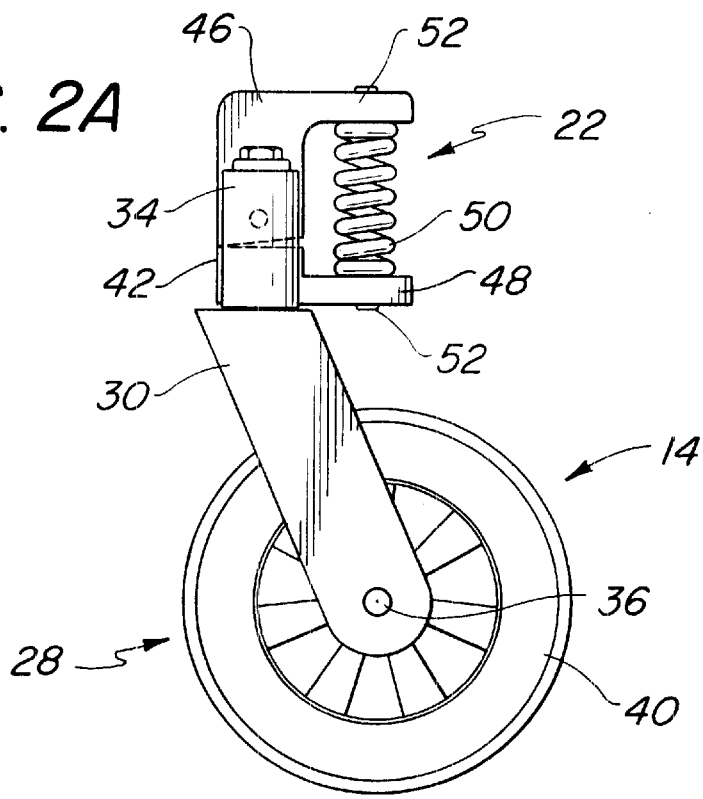
FIG. 2A is a side elevational view of the caster suspension of FIG. 1 showing the caster positioned toward the front of the wheelchair.

Although it is desirable for a caster suspension to be compliant in the aforementioned situations, it is not desirable for it to be compliant when the wheelchair is driven backwards. When the wheelchair 10 is driven backwards, the casters 14 become positioned toward the front of the wheelchair 10, as shown in FIG. 2A. The stability of any rear-caster front or mid-wheel drive wheelchair driven backwards decreases because the swiveling of the casters toward the front of the wheelchair shortens the wheelbase and shifts more weight of the wheelchair and rider to the rear casters.

If a caster suspension permitted each caster to rotate counterclockwise from its position shown in FIG. 2A, the wheelchair would tilt backwards. The backwards tilt would further decrease the wheelchair's stability by causing the center of gravity of the wheelchair and rider to move even further to the rear of the wheelchair. This decrease in stability would be even more pronounced if the wheelchair were driven backward down a slope, off a curb or the like. The combination of the tilt due to the drive wheels being positioned higher than the casters and the tilt due to rotation of the casters could make the wheelchair unstable to the point that the wheelchair and rider would tip over backwards. The anti-tip suspension 22 of the present invention does not allow the caster 14 to rotate counterclockwise when it is positioned toward the front of the wheelchair 10.

Referring now to FIGS. 2–5, each caster 14 includes a wheel and tire assembly 28, a fork 30, a spindle 32 and a mounting sleeve 34. The wheel and tire assembly 28 is rotatably attached to the lower end of the fork 30 by an axle 36. The spindle 32 is rigidly attached at one end to the upper end of the fork 30 and is rotatably attached at the opposite end to the mounting sleeve 34 by means of a bearing 38. Although a spindle-type caster is shown, the caster may be another type, such as a flat-mounting type having a flat mounting bracket pivotally attached to the upper end of the fork. Moreover, in place of a fork, the caster may have a wheel support on only one side of the wheel. The wheel and tire assembly 28 preferably includes an inflatable elastomeric tire 40 to further enhance the ride smoothness of the wheelchair 10. One skilled in the art will recognize that there are many variations of casters suitable for use with a suspension of the present invention.

The rear suspension 20 includes a transverse support beam 42 pivotally attached to the wheelchair 10 by a pivot bolt 44 located midway between the sides of the wheelchair 10. Although a bolt is shown, the support beam 42 may be attached to the wheelchair 10 by another pivoting means such as a threaded stud threadedly engaging either the wheelchair or support beam, a pivot pin and cotter pin assembly, a roller bearing and axle assembly or the like. The pivot bolt 44 allows the support beam 42 to pivot as the casters 14 roll across uneven terrain in order to keep both casters 14 in contact with the ground.

Each end of the support beam 44 supports one of the anti-tip suspensions 22, which allows the corresponding caster 14 to pivot within a limited range of rotation with respect to the support beam 42. Each anti-tip suspension 22 includes a generally L-shaped rocker arm 46, a spring support 48 and a spring 50. The rocker arm 46 comprises a spring support leg 52 and a castor support leg 54. The lower end of the caster support leg 54 is pivotally attached to support beam 42 by a pivot pin 56. Other means of pivotally attaching the rocker arm to the support beam, such as a threaded stud threadedly engaging either the wheelchair or support beam, a pivot pin and cotter pin assembly, a roller bearing and axle assembly or the like, may be used. The mounting sleeve 34 is rigidly attached to the caster support leg 54, preferably by welding.

Figure 4:
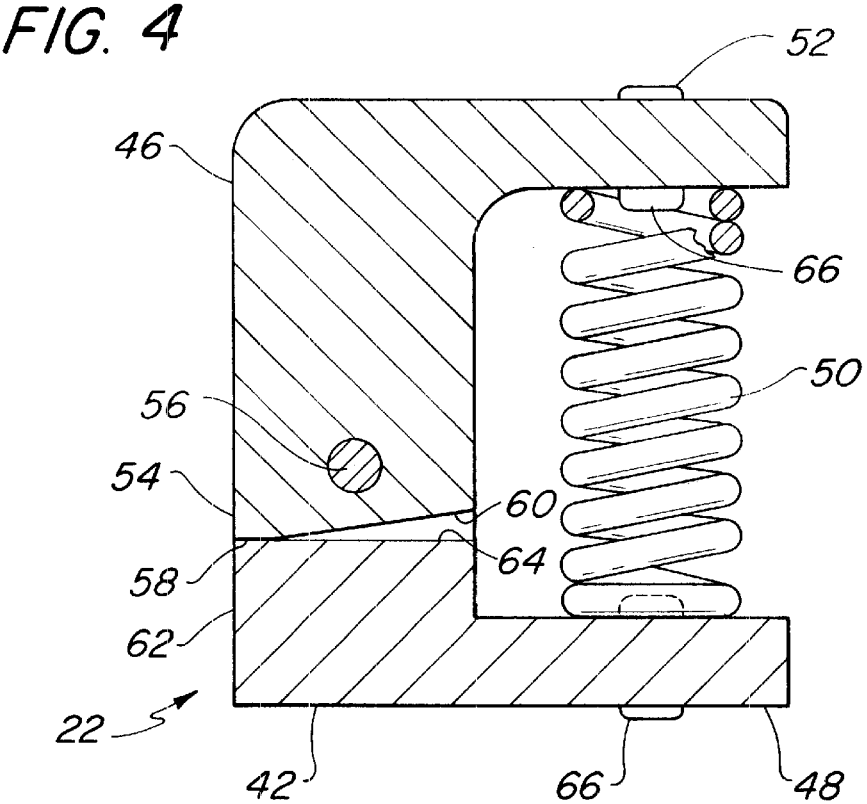
FIG. 4 is a cross-sectional view of the caster suspension taken along line 4—4 of FIG. 3.
Figure 5:
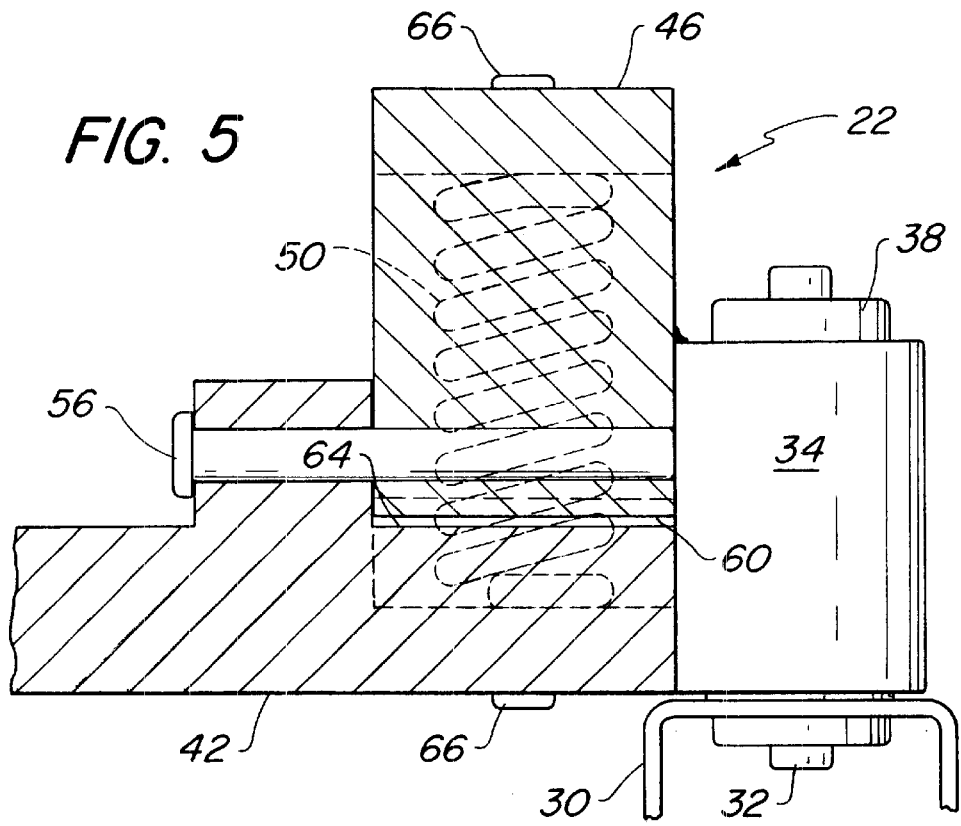
FIG. 5 is a cross-sectional view of the caster suspension taken along line 5—5 of FIG. 3.

The lower end of the caster support leg 54 has a horizontal contact surface 58 and a beveled contact surface 60. Each of these surfaces 58, 60 in conjunction with a rotation limiter 62 on the support beam 42 limits the range of rotation between the rocker arm 46 and the support beam 42 when the castor wheel is reversed indirection. Thus, the rotation limiter 62 restricts the rotation of the caster 14 about the support beam 42. As shown in FIG. 4, the rocker arm 46 is prevented from rotating counter-clockwise when the horizontal contact surface 58 contacts the rotation limiter 62 at limiting surface 64. Similarly, the rocker arm 46 is prevented from rotating clockwise when the beveled contact surface 60 contacts the limiting surface 64.

The spring support 48 is formed integrally with the support beam 42. However, it may be formed separately and attached to the support beam by welding, mechanical fastening, bonding or the like. In the preferred embodiment, the spring 50 is a coil spring. Other types of springs or resilient members such as an elastomeric body, a compressible fluid device or the like may be used. Opposite ends of the spring 50 engage the corresponding spring support 48 and spring support leg 52 and are retained thereon by retaining pins 66 that prevent the spring 50 from sliding laterally out of position. Other types of retaining means, such as U-shaped brackets engaging the coil at either end of the spring, a rod through the center of the spring, welding or the like may be used.

The spring 50 biases the horizontal contact surface 60 toward the contact surface 58 and is compressed when a clockwise moment (as viewed in FIG. 4) is applied to the rocker arm 46. The spring rate of the spring 50 is selected so that the anti-tip suspension 22 is relatively compliant during acceleration, upon contact with an obstacle and when the wheelchair is driven forward up a slope, curb or the like.

One skilled in the art will recognize that there are many possible configurations of an anti-tip suspension according to the present invention. For example, the support beam may be eliminated and the anti-tip suspension mounted directly to a wheelchair. In addition, the location of the pivot axis of the rocker arm with respect to the support beam and/or the rocker arm may be changed. The suspension may be modified so that the spring elongates rather than compresses to provide the aforementioned compliance. Moreover, the anti-tip suspension may be used for other types of wheelchairs, such as conventional non-motorized, front drive or rear drive wheelchairs.

Referring now to FIGS. 6 and 7, there is shown an embodiment of a suspension 22' for an articulating caster support. The suspension 22' includes a rocker arm support 68, a rocker arm 46' and a pair of casters 14'. The rocker arm support 68 is pivotally mounted to a frame member 70 of a wheelchair by a nut and bolt connection 72, which allows the anti-tip suspension 22' to pivot so that the casters 14' can remain in contact with ground as the casters 14' roll across terrain that is uneven in the direction transverse to the wheelchair.

The rocker arm support 68 generally forms a J shape and has a spring support leg 74 and a beam support leg 76. The rocker arm 46' comprises a generally U-shaped caster support beam 78 and an upstanding spring support 80 rigidly attached to the support beam 78. The spring support 80 is flanked by a pair of gusset plates 82 rigidly attached to the support beam 78. The support beam 78 is pivotally attached to the rocker arm support 68 by a pivot pin 56' that extends through the gusset plates 82 and the beam support leg 76. The casters 14' are swivelably attached to opposite ends of the support beam 78.

A coil spring 50' extends between the spring support 80 and the spring support leg 74 and biases them away from one another. A rotation limiter comprising a nut and bolt assembly 84 extends through the spring supports 80, spring support leg 74 and the coil spring 50' to prevent the spring 50' from moving out of its position between the spring support 80 and spring support leg 74 and limit the counter-clockwise (as viewed in FIG. 7) rotation of the rocker arm 46' relative to the rocker arm support 68. Although a nut and bolt assembly is shown, other means of limiting the extension of the spring, such as rod having cotter pins at either end, a rod having a head at each end or the like, maybe used.

The casters 14' are of the spindle type and are pivotally mounted to the support beam at opposite ends thereof. Other types of casters, such as those mentioned above with respect to FIGS. 1–5 may be used.

One skilled in the art will recognize that the embodiment shown in FIGS. 6 and 7 may be modified to suit a particular application. For example, the distance that the casters 14' trail behind the pivot pin 56' and the distance from the pivot pin 56' to the longitudinal axis of the spring 50' may be changed. All other things being equal, increasing the trailing distance between the pivot pin 56' and the casters 14' would decrease the angle that the rocker arm 46' rotates through, and the distance the spring 50' compresses for a given vertical displacement of the casters 14'. Similarly, the distance the spring compresses for a given vertical displacement of the casters 14' can be adjusted by changing the distance between the pivot pin 56' and longitudinal axis of the spring 50'. An additional design variable that must be considered is the spring rate of the spring 50'. By properly selecting values for these variables and designing other components of the wheelchair to be compatible with those values, one skilled in the art can design the anti-tip suspension to perform optimally under each of the above-described conditions.

In order to provide the embodiment shown in FIGS. 6 and 7 with the anti-tip feature, the spring 50' must pre-compressed before it is engaged with the spring support 80 and spring support leg 74 to provide a precompressive force equal to or greater than the force that would be applied to the spring 50' when the casters 14' are loaded and positioned toward the front of the wheelchair. This is so because when the casters 14' are in such a position, a vertical load applied to the casters 14' cause a clockwise movement in the suspension 22' due to the casters' axles being located rearward of the pivot pin 56' when the casters 14' are positioned toward the front of the wheelchair.

It should be understood that the suspension 22' may be used with any type of caster and is not limited to that shown in FIGS. 1–5 or otherwise shown or described herein.

Figure 8:
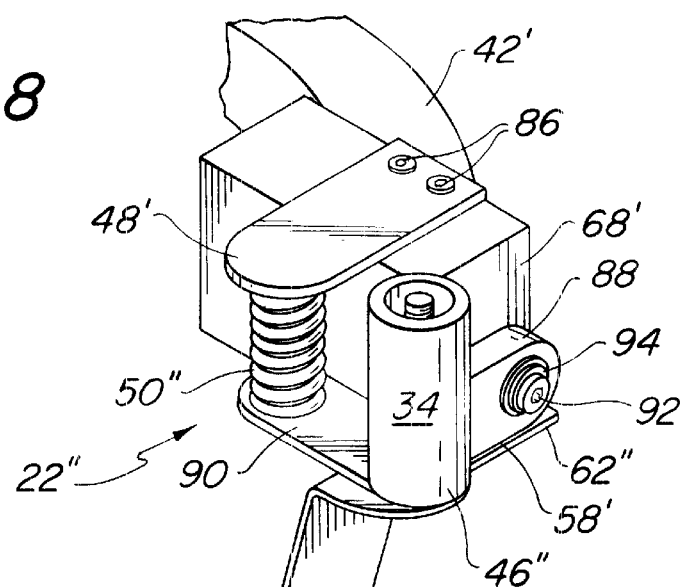
FIG. 8 is a perspective view of a second alternative embodiment of a caster suspension according to the present invention.
Figure 9:
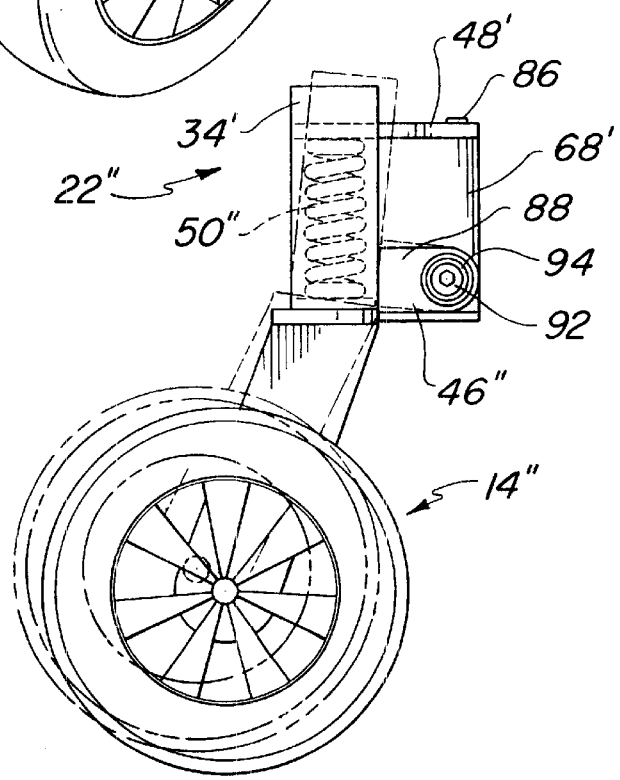
FIG. 9 is a side elevational view of the caster suspension shown in FIG. 8.

Referring now to FIGS. 8 and 9, there is shown another embodiment of an anti-tip suspension 22" according to the present invention. The suspension 22" includes a rocker arm support 68', a rocker arm 46" and a caster 14". The rocker arm support 68' is rigidly attached to a support beam 42', which attaches the suspension 22" to a wheelchair in a manner similar to support beam 42 in the embodiment of FIGS. 1–5.

The rocker arm support 68' includes a rotation limiter 62" and a spring support 48'. Although the rotation limiter 62" and the spring support 48' are shown as being, respectively, formed integrally with the rocker arm support 68' and a separate component attached to the rocker arm support 68' by screws 86, each may be formed integrally with the rocker arm support or formed separately and attached to the rocker arm support by mechanical fastening, adhesive bonding, welding or the like.

The rocker arm 46" includes a sleeve 34', a pivot bracket 88 and a spring support 90. The sleeve 34' engages a spindle 32' of the caster 14". The pivot bracket 88 is rigidly attached to the sleeve 34' and is pivotally attached to the rocker arm support 68' by a bolt 92 and washer 94, allowing the rocker arm 46 to rotate relative to the rocker arm support 68'. The spring support 90 is rigidly attached to the sleeve 34'. The pivot bracket 88 and spring support 90 are preferably attached to the sleeve 34' by welding.

A spring 50" extends between and engages the spring supports, 48' 90, biasing them away from one another. A contact surface 58' formed on the pivot bracket 88 is engagable with the rotation limiter 62" to limit counter clockwise rotation of the rocker arm 46" with respect to the rocker arm support 68'. Depending on the design of the suspension, the axle of each caster may be located rearward of the pivot bolt 92 when it is positioned toward the front of the wheelchair. In such a situation, it is preferable that the spring 50" be pre-compressed to provide a force such that when the caster 14" is swivelled toward the front of the wheelchair (similar to the caster position shown in FIG. 2A) the rocker arm 46" does not rotate relative to the rocker arm support 68'.

Figure 11:
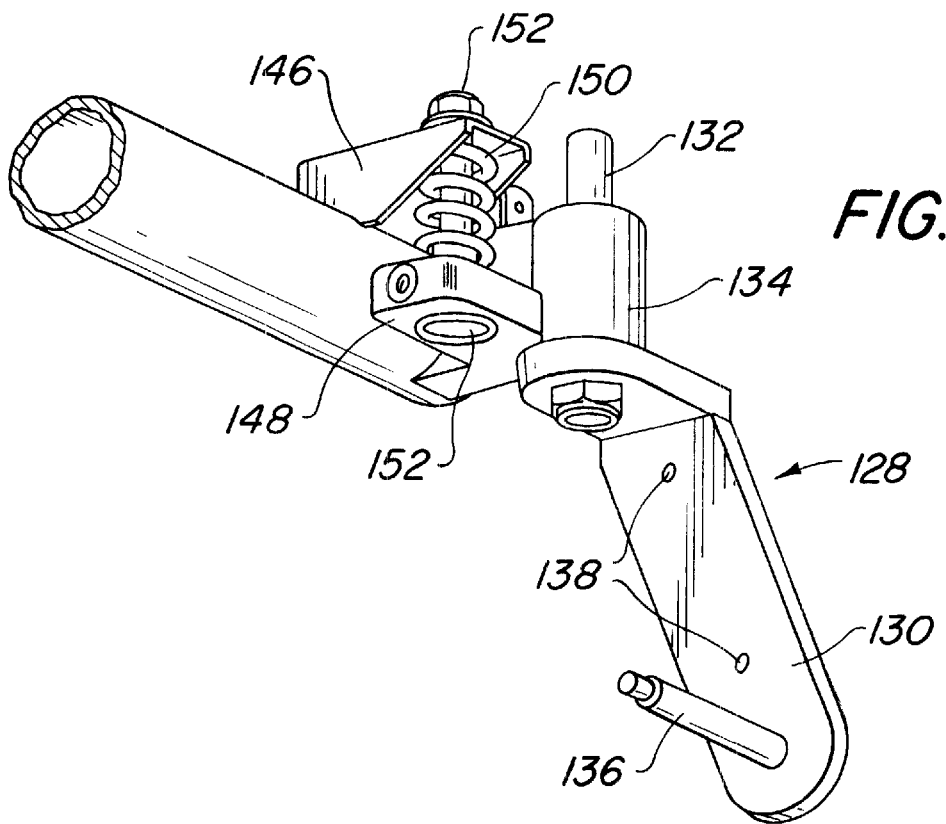
FIG. 11 is a close-up perspective view of the caster suspension system shown in FIG. 10.

In FIGS. 10–12 there is shown an alternate embodiment of the rear suspension arm construction having a resilient anti-tip suspension thereon. The rear suspension arm 120 is a generally cylindrical rod having two ends. Shown on one end of the rod is an anti-tip suspension 122. The anti-tip suspension 122 is mounted on a projecting shaft 124. A shaft 124 is shown on each end of the arm 120. In the center of the suspension arm 120 is an opening 144 which is adapted to receive a pivot bolt (not shown) which would project from the frame of the wheelchair. The pivot bolt opening 144 permits the suspension arm 120 to rotate around the pivot bolt in the manner previously described. At each end of the rear suspension arm is attached a spring support arm 146. The support arm 146 supports a spring 150 by means of a retention bolt 152. The retention bolt 152 passes through an opening in the arm 146, through the spring 150 and is attached at its opposite end to a spring support 148. The spring support 148 is attached to a mounting sleeve 134 that supports a spindle 132 for the caster assembly 128 (discussed in more detail below).

As shown in more detail in FIG. 12, the mounting sleeve 134 for the spindle 132 is attached to a pivot bracket 188 which is rotatably secured to the projecting shaft 124 on the suspension arm 120. This rotational mounting of the pivot bracket 188 forms a rocker arm and permits the mounting sleeve 134 and its corresponding caster assembly 128 to rotate about the axis of the projecting shaft 124 and the rear suspension arm 120. The retention bolt 152 restricts the amount of rotation that can occur in the counterclockwise direction (as seen in FIG. 12) about the shaft 124. Clockwise rotation about the shaft 124 (again as seen in FIG. 12) is resiliently supported by the spring 150 maintained between the two spring supports 148 and 146 (as shown in FIG. 11). Thus, the structure is similar to that shown in the embodiment of FIGS. 8 and 9, while the rotation limiter is similar to that shown in the embodiment of FIGS. 6 and 7.

Providing on the top surface of the pivot bracket 188 is a C shaped support 126. An ornamental cover (not shown) may be positioned over the suspension assembly 122 and attached to the assembly by means of support 126.

In FIGS. 10–12, the caster assembly 128 includes a single fork element for supporting a caster wheel (not shown) on a horizontal axle 136. In some situations a single sided caster support may be advantageous to prevent marking or marring of walls and surfaces as the wheelchair moves and turns. Two openings 138 are provided on the fork 130 for mounting of a casing that surrounds a portion of the caster wheel. The casing may include resilient elements which cushion the impact of the caster during use of the wheelchair. It is noted that in FIGS. 8 and 9, the single fork element is positioned on the relative inside of the caster wheel. This arrangement serves to prevent the fork from contacting surfaces when the wheelchair is moving forward.

Figure 13:
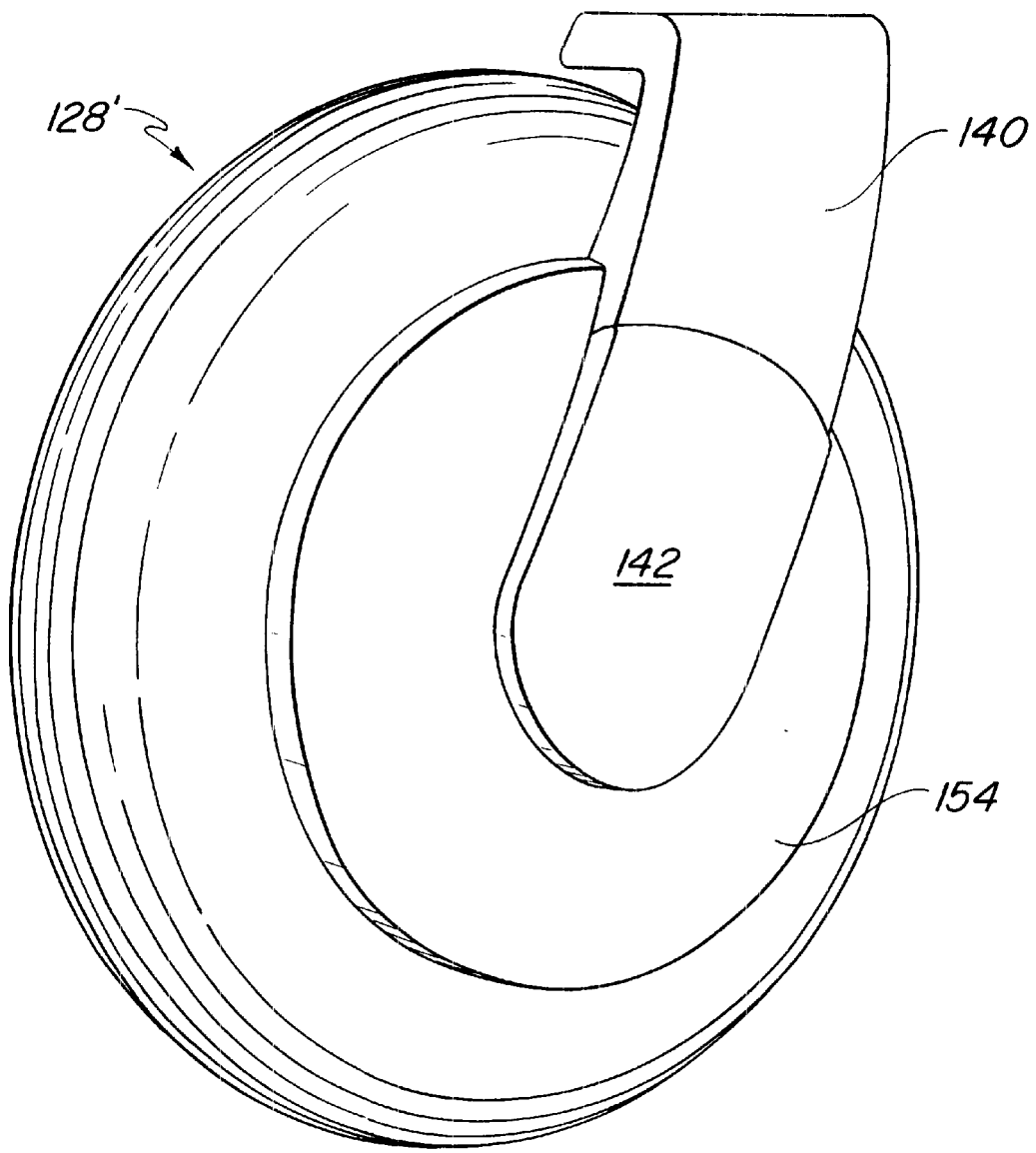
FIG. 13 is a perspective view of a caster for use with the suspension of the present invention.

In the embodiment of FIGS. 10–12, the fork 130 is positioned on the outside of the caster assembly 122. Since normal operation of the wheelchair will be in the forward direction, the caster wheel may be provided with a casing such as that shown in FIG. 13. The casing 140 is secured to the fork structure, such as that shown in FIG. 12, by means of the openings 138 therein. The casing or cover wraps around the outside of the caster support and is made of a resilient plastic or a soft, pliable material. A resilient hub cover 142 may also be provided in the center of the wheel cover element 154. By this construction, the exposed surfaces of the wheel, which supports the tire of the caster, is completely covered. Any contact with a base board or wall surface will be cushioned by means of the cover 140, the hub cover 142 or the wheel cover 154. On the opposite side of the caster, the wheel may be recessed so as to limit the amount of contact that might occur when the caster is positioned in the opposite direction due to a reversal of the wheelchair movement.

Figure 14:
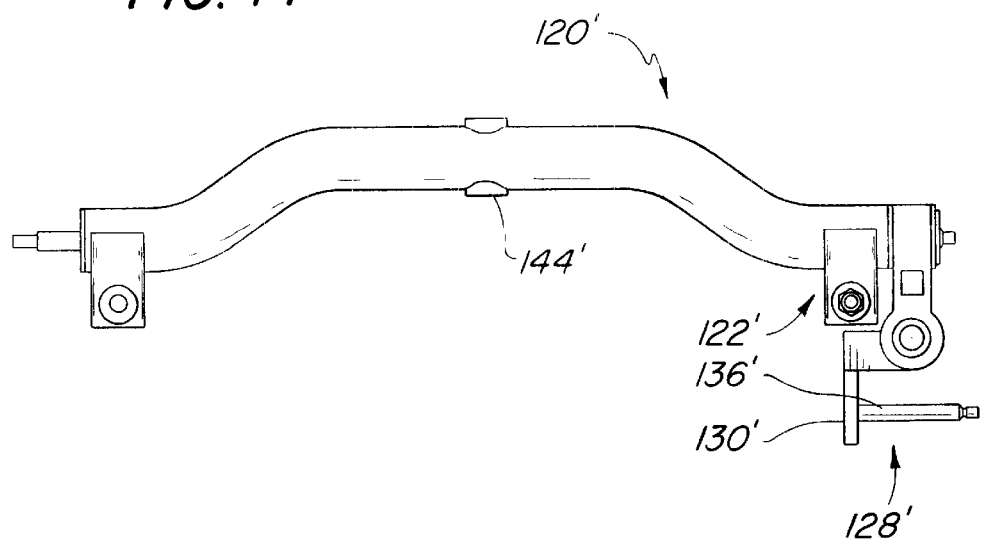
FIG. 14 is a top plan view of an alternate embodiment of the caster suspension system of the present invention.
Figure 15:
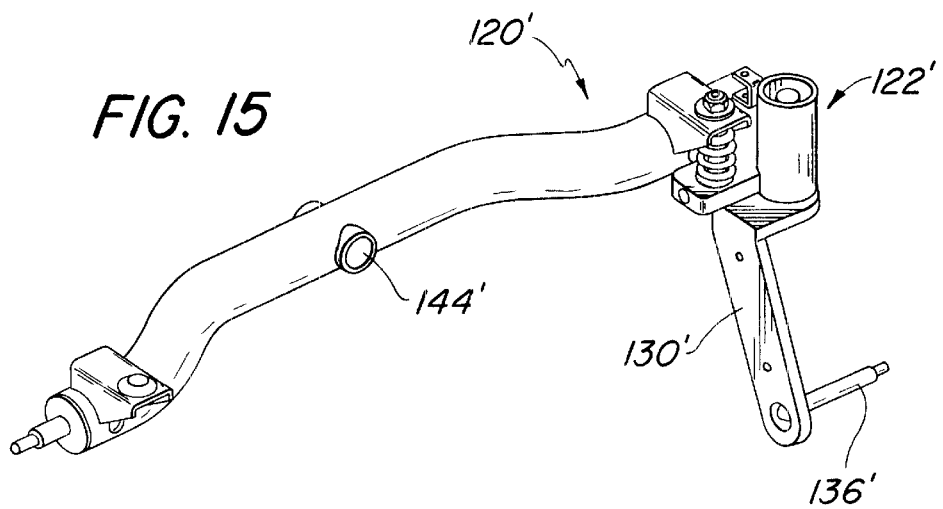
FIG. 15 is a perspective view of the caster suspension embodiment of FIG. 14.

FIGS. 14 and 15 show a further alternate embodiment of the rear suspension arm which is generally designated by the numeral 120. The basic difference between the construction shown in FIGS. 10–12 and that shown in FIGS. 14 and 15 relates to the bends in the suspension arm on opposite sides of the pivot bolt opening 144'. The bend in the suspension arm 120' permit the anti-tip suspension 122 to trail the mounting point of the rear suspension arm 120 to the frame of the wheelchair (not shown). This construction will provide the advantages outlined in the embodiment in FIGS. 6 and 7 above. It is also noted that the caster assembly 128' in the embodiments of FIGS. 14 and 15 is reversed of that shown in the embodiment of FIGS. 10–12. Thus, the fork element 130' is positioned relatively inward with the axle 136' projecting outwardly. This arrangement may be varied as desired depending on the type of caster being utilized and the type of fork contemplated. Other modifications and variations of the structure may be contemplated by those of skill in the art without departing from the essence of the present invention.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A caster and suspension assembly, comprising:
   a rocker arm support;
   a rocker arm having a pivot axis, the rocker arm pivotally attached to the rocker arm support such that the rocker arm may be pivoted relative to the rocker arm support about the pivot axis;
   a caster swivelably attached to the rocker arm;
   a resilient member having a pair of spaced-apart ends, one end engaging the rocker arm support and the other end engaging the rocker arm; and
   a rotation limiter engaging the rocker arm support, the rotation limiter limiting the rotation of the rocker arm relative to the rocker arm support in one direction, the assembly having an unloaded configuration wherein the resilient member biases the rocker arm into engagement with the rotation limiter.

2. The caster and suspension assembly of claim 1 wherein the resilient member is a coil spring.

3. The caster and suspension assembly of claim 1 wherein the rocker arm support and the rocker arm each include a spring support having a face, the faces being located in spaced-apart relationship with one another, the resilient member extending between the faces and biasing them away from one another.

4. The caster and suspension assembly of claim 3 wherein the rocker arm is generally L-shaped and comprises first and second legs each having a free end, one of the legs comprising the spring support of the rocker arm.

5. The caster and suspension assembly of claim 4 wherein a castor is swivelably attached to the first leg and the second leg comprises the spring support of the rocker arm.

6. The caster and suspension assembly of claim 4 wherein the rotation limiter comprises a limiting surface on the rocker arm support that engages a first contact surface formed on the free end of the first leg when the resilient member biases the rocker arm into contact with the rotation limiter.

7. The caster and suspension assembly of claim 6 wherein the rocker arm comprises a second contact surface formed on the free end of the first leg, the second contact surface engaging the limiting surface on the rocker arm support upon rotation of the rocker arm through a predefined angle in the direction of rotation opposite that which is limited by the engagement of the first limiting surface with the contact surface.

8. The caster and suspension assembly of claim 7 wherein the first and second limiting surfaces are contiguous with one another.

9. The caster and suspension assembly of claim 3 wherein the rotation limiter comprises a rod extending through the resilient member and each of the spring supports.

10. The caster and suspension assembly of claim 3 wherein the rocker arm comprises a sleeve, a pivot bracket and the rocker arm spring support, the pivot bracket and the rocker arm spring support being rigidly attached to the sleeve, the sleeve for engaging a spindle of a caster.

11. The caster and suspension assembly of claim 10 wherein the rotational limiter comprises a limiting surface formed on the rocker arm support, the limiting surface engaging a contact surface on the pivot bracket when the resilient member biases the rocker arm into contact with the rotation limiter.

12. The caster and suspension assembly of claim 1 wherein the rocker arm support comprises a support beam having a pair of spaced-apart ends, each end of the support beam having a caster swivelably attached thereto.

13. A caster and suspension assembly, comprising:
   a rocker arm support, the rocker arm support having a spring support;
   a rocker arm, the rocker arm having a caster support, a spring support and a pivot axis, the caster support and spring support being rigidly attached to one another, one of the spring supports being spaced from the other, the rocker arm being pivotally attached to the rocker arm support for rotation of the rocker arm relative to the rocker arm support about the pivot axis;
   a spring engaged with and extending between the spring supports; and a caster swivelably attached to the caster support;

the rocker arm support including a rotation limiter, the rotation limiter limiting the rotation of the rocker arm relative to the rocker arm support in one direction, the assembly having an unloaded configuration wherein the spring biases the rocker arm into engagement with the rotation limiter.

14. The caster and suspension assembly of claim 13 wherein the rotation limiter comprises a limiting surface on the rocker arm support, the limiting surface engaging a first contact surface formed on the caster support when the spring biases the rocker arm into engagement with the rotation limiter.

15. The caster and suspension assembly of claim 13 wherein the rotation limiter comprises a rod extending through the spring and the spring supports.

16. The caster and suspension assembly of claim 13 wherein the caster support comprises a sleeve and the rocker arm further comprises a pivot bracket, the pivot bracket and the rocker arm spring support being rigidly attached to the sleeve, the sleeve for engaging a spindle of a caster.

17. The caster and suspension assembly of claim 16 wherein the rotational limiter comprises a limiting surface formed on the rocker arm support, the limiting surface engaging a contact surface on the pivot bracket when the spring biases the rocker arm into contact with the rotation limiter.

18. The caster and suspension assembly of claim 13 wherein the rocker arm comprises a second contact surface formed on the free end of the first leg, the second contact surface engaging the limiting surface on the rocker arm support upon rotation of the rocker arm through a predefined angle in the direction of rotation opposite that which is limited by the engagement of the first limiting surface with the contact surface.

19. A suspension for a wheelchair, comprising:

a support beam having a pair of opposing ends, the beam adapted to pivotally attach to a wheelchair such that the opposing ends are located adjacent opposite sides of the wheelchair;

a pair of rocker arms each having a caster support, a spring support and a pivot axis, the caster and spring support being rigidly attached to one another, the spring support on each rocker arm being in spaced-apart relation to a corresponding spring support on the support beam, the rocker arms being pivotally attached to the support beam at corresponding opposite ends such that the rocker arms may be rotated relative to the support beam about their respective pivot axes;

a pair of springs each engaged with and extending between a corresponding pair of spring supports on the rocker arms and support beam;

a pair of casters each swivelably attached to a corresponding caster support; and a rotation limiter located on each end of the support beam, each rotational limiter engagable with the corresponding rocker arm for limiting the amount of rotation of the rocker arm relative to the support beam in one direction, the suspension having an unloaded configuration wherein each spring biases the corresponding rocker arm into engagement with the corresponding rotation limiter.

20. The suspension of claim 19 wherein each rotation limiter comprises a contact surface on a corresponding end of the support beam, the contact surface engaging a first limiting surface formed on the corresponding caster support when the corresponding spring biases the rocker arm into engagement with the rotation limiter.

21. The suspension of claim 19 wherein each rotation limiter comprises a rod extending through the spring and the spring supports.

22. The suspension of claim 19 wherein each caster support comprises a sleeve and each rocker arm further comprises a pivot bracket, the pivot bracket and the rocker arm spring support being rigidly attached to the sleeve, the sleeve for engaging a spindle of the corresponding caster.

23. The suspension of claim 22 wherein each rotational limiter comprises a limiting surface on a corresponding end of the support beam, the limiting surface engaging a contact surface on the corresponding rocker arm when the corresponding spring biases that rocker arm into engagement with the rotation limiter.

24. A rear-caster wheelchair having a longitudinal axis, a front end and a rear end, comprising:

a pair of casters;

a caster suspension attached to the wheelchair adjacent its rear end, the suspension including a rocker arm support;

a rocker arm having a pivot axis, the rocker arm pivotally attached to the rocker arm support such that the rocker arm may be pivoted relative to the rocker arm support about the pivot axis, at least one of the casters being swivelably mounted to the rocker arm;

a spring having a pair of spaced-apart ends, one end engaging the rocker arm support and the other end engaging the rocker arm; and a rotation limiter engaging the rocker arm support, the rotation limiter limiting the rotation of the rocker arm relative to the rocker arm support in one direction, the assembly having an unloaded configuration wherein the spring biases the rocker arm into engagement with the rotation limiter.

25. The wheelchair of claim 24 wherein the spring is a coil spring.

26. The wheelchair of claim 24 wherein the rotational limiter comprises a rod extending through the spring supports and the spring.

27. The wheelchair of claim 24 wherein the rocker arm comprises a caster support beam, the support beam being located transverse to the longitudinal axis of the wheelchair and having a pair of spaced-apart ends, the casters being swivelably attached to the support beam at opposite ends of the support beam.

28. The suspension of claim 27 wherein the rocker arm is pivotally attached to a wheelchair such that the caster support beam is pivotable.

* * * * *